(No Model.)
J. G. CLAUD-MANTLE.
APPARATUS FOR PLACING AND OBTAINING THE MEAN VALUE OF ORDINATES.
No. 359,499. Patented Mar. 15, 1887.
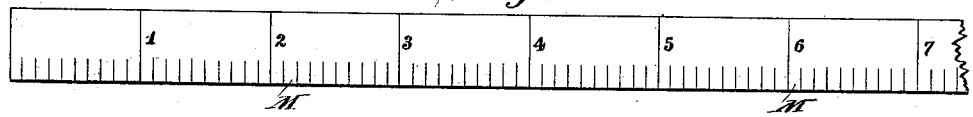
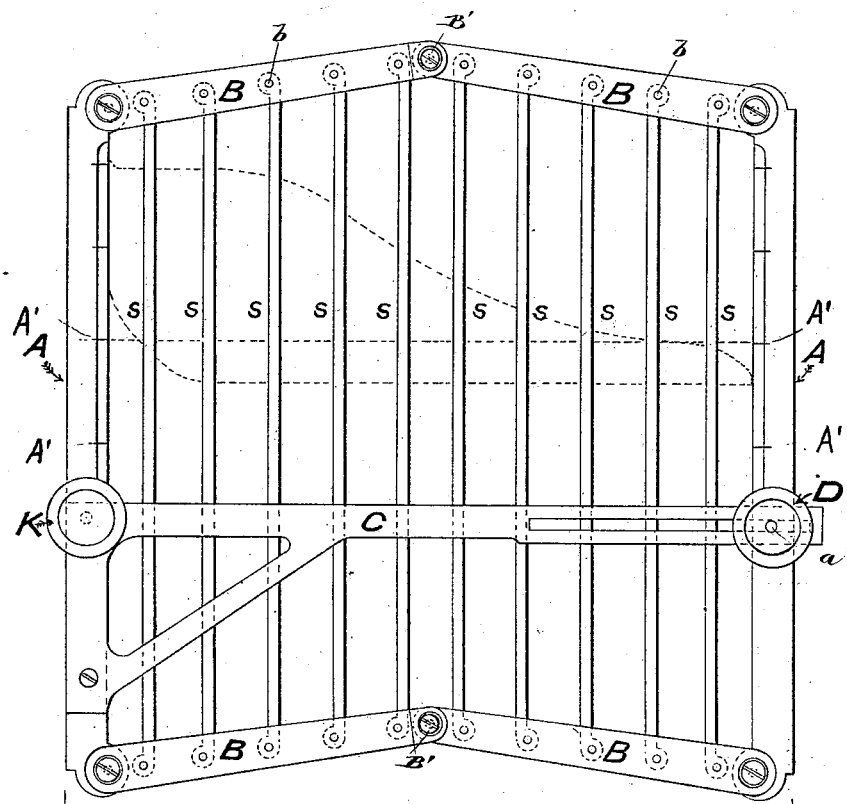
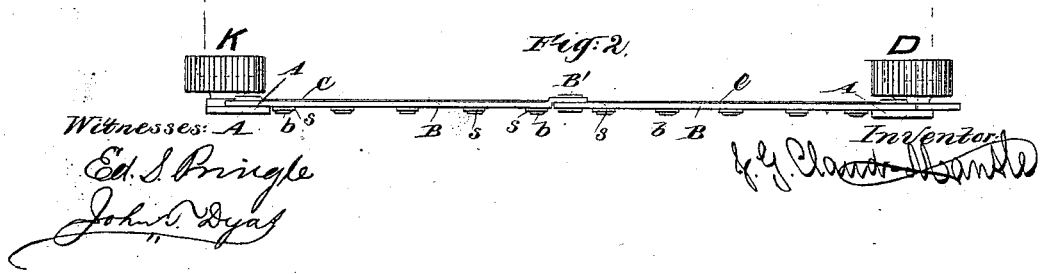

UNITED STATES PATENT OFFICE.

JOSEPH G. CLAUD-MANTLE, OF ANTWERP, BELGIUM.

APPARATUS FOR PLACING AND OBTAINING THE MEAN VALUE OF ORDINATES.

SPECIFICATION forming part of Letters Patent No. 359,499, dated March 15, 1887.

Application filed October 6, 1886. Serial No. 215,496. (No model.) Patented in England July 9, 1886, No. 8,984.

*To all whom it may concern:*

Be it known that I, J. G. CLAUD-MANTLE, a subject of the Queen of Great Britain, residing at Antwerp, in the Kingdom of Belgium, temporarily in New York city, in the State of New York, engineer, have invented a new and Improved Apparatus for Placing and Obtaining the Mean Value of Ordinates, of which the following is a specification.

This invention relates to a new or improved ordinator or gridiron-ruler, and also to a scale for use in connection therewith, for the purpose of giving the positions of certain lines and divisions in connection with the abscissa or base line and the like (actual or supposed) of any diagram or figure. The instrument provides that these ordinates, lines, or points may have the same relative position in respect to each other whatever may be the sum of their distances. For example, let $x$ denote the abscissa or sum of distances, and $a\ b\ c\ d$, &c., the several relative distances of the ordinates, lines, or points. Then if $x$ becomes $yx$ or $\dfrac{x}{y}$ ($y$ either integral or fractional) the instrument provides that $a\ b\ c\ d$, &c., become $ya\ yb\ yc\ yd$, &c., or $\dfrac{a\ b\ c\ d}{y\ y\ y\ y}$, &c., as the case may be.

The instruments are varied in detail in special adaptations for certain purposes. They are, first, those for which, while the abscissa or equivalent may be varied in length at pleasure, the ordinates or their equivalents remain at fixed relative distances, as before explained, and, secondly, those in which these relative distances of ordinates, &c., as also their sum or abscissa, &c., may both be varied at pleasure.

In a form of instrument of the first-named class, the denoters or ruling-edges for ordinates, &c., are so relatively distanced that the sum of the lengths of the ordinates (for which they form the ruling-edges or denoters) divided by the number of them will give a length equal to their mean. Now, taking an indicator-diagram, the mean ordinate represents the mean pressure, and also in any figure the mean height or ordinate (as the case may be) multiplied by the sum of the distances of such will give its area. The instrument is to give the positions of these ordinates. The scale gives at reading their mean value. This mean value is all that is required from an indicator-diagram for the purpose of calculating the horsepower.

My scales comprise the ordinary scales of any measure, but having this difference, that whereas in ordinary scales each length or division represents to scale some fixed length, and is denoted (usually by figures) by that length which it represents, in my scales these divisions, though retaining their original designations, are increased in length as many times as there are ordinates in the instrument to which it refers. For example, suppose a diagram having, say, ten ordinates between its containing perpendiculars, and these ordinates so distanced that the sum of their lengths divided by their number gives a length equal to their mean length. Again, suppose the diagram to scale of one-eighth of an inch and the total length of ordinates measures to scale $\frac{4.0}{8}$, then evidently their mean value is $\frac{4}{8}$. Now my scales have this difference, that whereas this length, if applied to ordinary scales, would read $\frac{4.0}{8}$, in mine it reads $\frac{4}{8}$. In other words, my scales give the mean reading directly from the sum of the lengths.

In a form of instrument of the second-named class provision is made whereby the relative distances of the denoters or ruling-edges for ordinates may be varied at pleasure.

In general, the object of the instrument in its varied forms is to at once denote the positions of the extreme perpendiculars, as also the bisecting perpendiculars, of ten or other chosen number of ordinates in chosen relative position between the containing perpendiculars, or of any number of ordinates, lines, or points in any desired relative position in respect to either containing perpendiculars or extremities.

To my scale are affixed formula and memoranda in special relation to the purposes for which the instrument is adapted, or such as are specially useful to those for whom it is intended. Such formula and memoranda I do not claim as part of my apparatus.

In carrying out the invention the instrument is constructed of two end bars, on which are marked corresponding lines. A cross-bar is fixed on one of the end bars at right angles thereto, and serves to keep the end bars parallel, and also the required distance apart, by means of a pin or stud which works in a slot in the cross-bar, or by any other suitable sliding arrangement. A number of parallel bars are jointed to lever-bars or connecting-links, which are jointed to the said end bars, the aforesaid parallel bars being in such relative position as may suit any particular purpose. A milled headed button or knob or other suitable attachment is provided on the end bars for the purpose of lifting, placing, or retaining the instrument in position. A milled nut works over the end of the said pin or stud, (or other suitable clamping arrangements may be provided,) whereby the instrument may be fixed for any number of diagrams or figures of the same length.

The parallel bars and connecting-links to which they are attached may be of any desired form, number, length, and material. On the aforesaid cross-bar there may be any desired scale of lengths or suitable divisions adapted for particular purposes.

The various centers and screws connecting the several parts may be of any suitable design, material, or materials.

Appliances—such as perforators, prickers, or markers, or suitable attachments for the same—are added as found desirable.

The accompanying drawings form a part of this specification, and represent what I consider the best means of carrying out the invention.

Figure 1 is a face view of the instrument adjusted and applied in position for drawing the lines on an indicator-diagram. The diagram is shown in dotted lines. Fig. 2 is an edge view of my instrument. Fig. 3 is a face view of the scale constructed therefor.

Similar letters of reference indicate like parts in all the figures.

The apparatus comprises a new or improved form of parallel ruler or diagram-ordinator and a detached scale for use in connection therewith.

The purpose of the instrument is to at once obtain the positions for drawing in or denoting the extreme perpendiculars, as also the bisecting perpendiculars, of ten or other chosen number of divisions between the extreme and containing perpendiculars, or of any number of ordinates in any desirable relative positions in respect to one or both of the containing perpendiculars.

The purpose of the detached scale is to give directly, and without calculation, the mean of those ordinates, which in the case of an indicator-diagram represents the mean pressure.

The instrument is constructed of two end bars, A, on which are marked corresponding lines A' A'. A cross-bar, C, is fixed on one of the end bars and serves to keep the end bars parallel to each other and prevent any lateral motion by means of a stud in the other end bars, which works in a slot in the cross-bar, or by any other suitable sliding arrangement. A number (say ten) of parallel bars, $s$, are jointed to lever-bars or connecting-links B, which are themselves jointed to the end bars, the said parallel bars being in any desired relative position. A milled headed button or knob, K, or other suitable attachment is provided on one of the end bars for the purpose of lifting, placing, or retaining the instrument in position. A milled nut or knob, D, works over the end of the said pin or stud, (or other suitable clamping arrangements may be provided,) whereby the instrument can be fixed for any number of diagrams or figures of the same length. In an instrument of the second-named class the bars $s$ are jointed in such a manner that they may be shifted or slid to other positions. This is effected by having any number of other holes in the lever-bars B, which holes may be in any desired positions, or in place of such holes the pivots on which the bars $s$ move may themselves slide in slots in those end bars, B, these pivots having ends adapted to slide and retain themselves in any position placed.

M is the scale. It is graduated to correspond with the instrument, having ten bars, $s$.

I claim as my invention—

1. The combination of the two side bars, A, four cross-bars, B, and spaced intermediate bars, $s$, with connecting-pivots arranged for joint operation, as herein specified.

2. The side bars, A, cross-bars B, intermediate bars, $s$, and connecting-pivots, in combination with a cross-bar, C, rigidly fixed on one of the side bars, and with an adjusting-clamp, D, arranged to serve as herein specified.

3. The two pairs of pivoted cross-bars, B, pivoted intermediate bars, $s$, side bars, A, provided with marks A' A', rigidly-connected arm C, threaded knob D, and opposite knob, K, combined and arranged to serve as herein specified.

4. The apparatus described, comprising a scale, M, graduated to correspond with the number of ordinates, and the instrument composed of the side bars, A, end bars, B, intermediate bars, $s$, arm C, and holding means D, adapted for joint operation, as herein specified.

In testimony whereof I have hereunto set my hand, at New York city, New York, this 18th day of September, 1886, in the presence of two subscribing witnesses.

J. G. CLAUD-MANTLE.

Witnesses:
THOMAS DREW STETSON,
M. F. BOYLE.